United States Patent
Friedman et al.

(10) Patent No.: US 7,231,178 B2
(45) Date of Patent: *Jun. 12, 2007

(54) VIRTUAL CHANNEL SATELLITE COMMUNICATION SYSTEM WITH IMPROVED BANDWIDTH EFFICIENCY

(75) Inventors: Robert F. Friedman, Fayetteville, AR (US); John A. Bush, Sunol, CA (US); Greg Garner, Springdale, AR (US); John C. Thacker, Los Altos, CA (US)

(73) Assignee: Virtual Satellite Corp., Fayetteville, AR (US)

( * ) Notice: Subject to any disclaimer, the term of this patent is extended or adjusted under 35 U.S.C. 154(b) by 484 days.

This patent is subject to a terminal disclaimer.

(21) Appl. No.: 10/379,018

(22) Filed: Mar. 4, 2003

(65) Prior Publication Data

US 2003/0199246 A1  Oct. 23, 2003

Related U.S. Application Data

(63) Continuation-in-part of application No. 10/316,591, filed on Dec. 10, 2002.

(60) Provisional application No. 60/362,184, filed on Mar. 4, 2002, provisional application No. 60/339,711, filed on Dec. 11, 2001.

(51) Int. Cl.
*H04B 7/185* (2006.01)

(52) U.S. Cl. .................. 455/12.1; 455/427; 455/452.2; 455/3.02

(58) Field of Classification Search ............... 455/13.1, 455/12.1, 101, 132, 137, 139, 138, 13.2, 455/13.3, 11.1, 59, 61, 3.02, 427, 429, 452.1, 455/452.2, 66.1; 370/316, 480, 315
See application file for complete search history.

(56) References Cited

U.S. PATENT DOCUMENTS

| | | | | |
|---|---|---|---|---|
| 6,154,501 | A * | 11/2000 | Friedman | .................... 455/13.1 |
| 6,363,263 | B1 * | 3/2002 | Reudink et al. | .......... 455/562.1 |
| 6,721,957 | B1 * | 4/2004 | Lawrence | .................... 370/538 |

* cited by examiner

*Primary Examiner*—Edward F. Urban
*Assistant Examiner*—John J. Lee
(74) *Attorney, Agent, or Firm*—DLA Piper US LLP

(57) ABSTRACT

Presented is a satellite communication system that allows aggregation of available transponder bandwidth. A channel signal is divided into subchannels if no full transponder is available to receive the channel signal in its entirety, and the subchannels are distributed among a available bandwidths in a plurality of transponders. At the receiving station, the subchannels are combined to form the original channel signal. The channel signal, whether divided and reconstructed or transmitted without being divided, are received into a switch matrix that receives a user channel selection and identifies the channel signal that corresponds to the selection. The identified channel signal is then demodulated and forwarded to a user interface unit. Only a single demodulator is necessary for a user interface unit.

17 Claims, 13 Drawing Sheets

VIRTUAL CHANNEL SATELLITE COMMUNICATION SYSTEM WITH IMPROVED BANDWIDTH EFFICIENCY

RELATED APPLICATIONS

This application claims priority from U.S. Provisional Application No. 60/362,184 filed on Mar. 4, 2002 and entitled "Full Transponder Channelization System," which is incorporated herein by reference in its entirety. This application is also a continuation-in-part application of U.S. patent application Ser. No. 10/316,591 filed on Dec. 10, 2002, which claims priority from U.S. Provisional Application No. 60/339,711 filed on Dec. 11, 2001.

BACKGROUND

This invention relates generally to satellite communications systems.

The satellite communications industry has experienced significant performance enhancements in the last few decades. Some examples of these performance enhancements include an increase in transmission power capability of satellite transponders, improvements in low-noise amplifier (LNA) characteristics, and a decrease in the size of receiving antennas. In satellite systems with a large number of receiving stations, it is particularly important to reduce the cost of each receiving unit and to design a system with a small receiving antenna to meet installation and aesthetic requirements. The need for a small receiving antenna has motivated an increase in transponder power output in order to maintain an acceptable signal-to-noise ratio (SNR) with the smaller antenna. As a result of these performance enhancements that boosted the popularity of small receiving antenna-high power transponder combination, the cost of low power transponders dropped significantly. However, many satellite users cannot take advantage of this economically efficient option because the bandwidth necessary to provide full featured programming is distributed among multiple low power transponders.

Attempts to overcome this problem include channel splitting, which includes splitting the original signal into subchannel signals, transmitting the subchannel signals through satellite transponders, and later recombining the subchannel signals so that the end user receives a reconstructed version of the original signal. Channel splitting, however, does not solve the problem of only a limited bandwidth being available for each subchannel. The limited bandwidth necessitates acquiring extra satellite capacity to transmit all the data, and the cost of developing extra satellite capacity might cancel out any cost saving associated with using a low power transponder. In order to make the use of the low power transponder an economically practical option, a way of using low power transponders and small receiving antennas without developing extra satellite capacity is needed.

SUMMARY

The invention is a method and system for cost-effectively using low power transponders and small receiving antennas in a satellite communications system. The invention reduces the need to develop extra satellite capacity by efficiently aggregating the available subchannel bandwidth(s) if doing so is advantageous. On the other hand, if a transponder that can handle an entire channel signal is available and there is no advantage to aggregating the available bandwidths from other subchannels, the channel signal is transmitted via the available full transponder.

As the subchannels arrive at the receiving station from various transponders, the subchannels are combined so that the original channel signal is reconstructed. If a channel signal is transmitted via a full transponder, this reconstruction is not necessary. A switch matrix receives all the channel signals and a user selection, and identifies the channel signal that corresponds to the user selection. The switch matrix connects the identified channel signal to a proper output port so that the channel signal is demodulated and forwarded to a user unit. The switch matrix, which discards all non-selected channel signals before the demodulation step, provides an added benefit of reducing the number of cables (e.g., co-axial cable between the outdoor equipment and the user unit) and demodulators in the system.

DESCRIPTION OF THE INVENTION

The invention is particularly directed to a satellite communication system wherein data is transmitted from an uplink station to a receiving station via satellite transponders, and will be described in that context. It will be appreciated, however, that this particular use is illustrative as only one utility of the invention.

Figure 1:
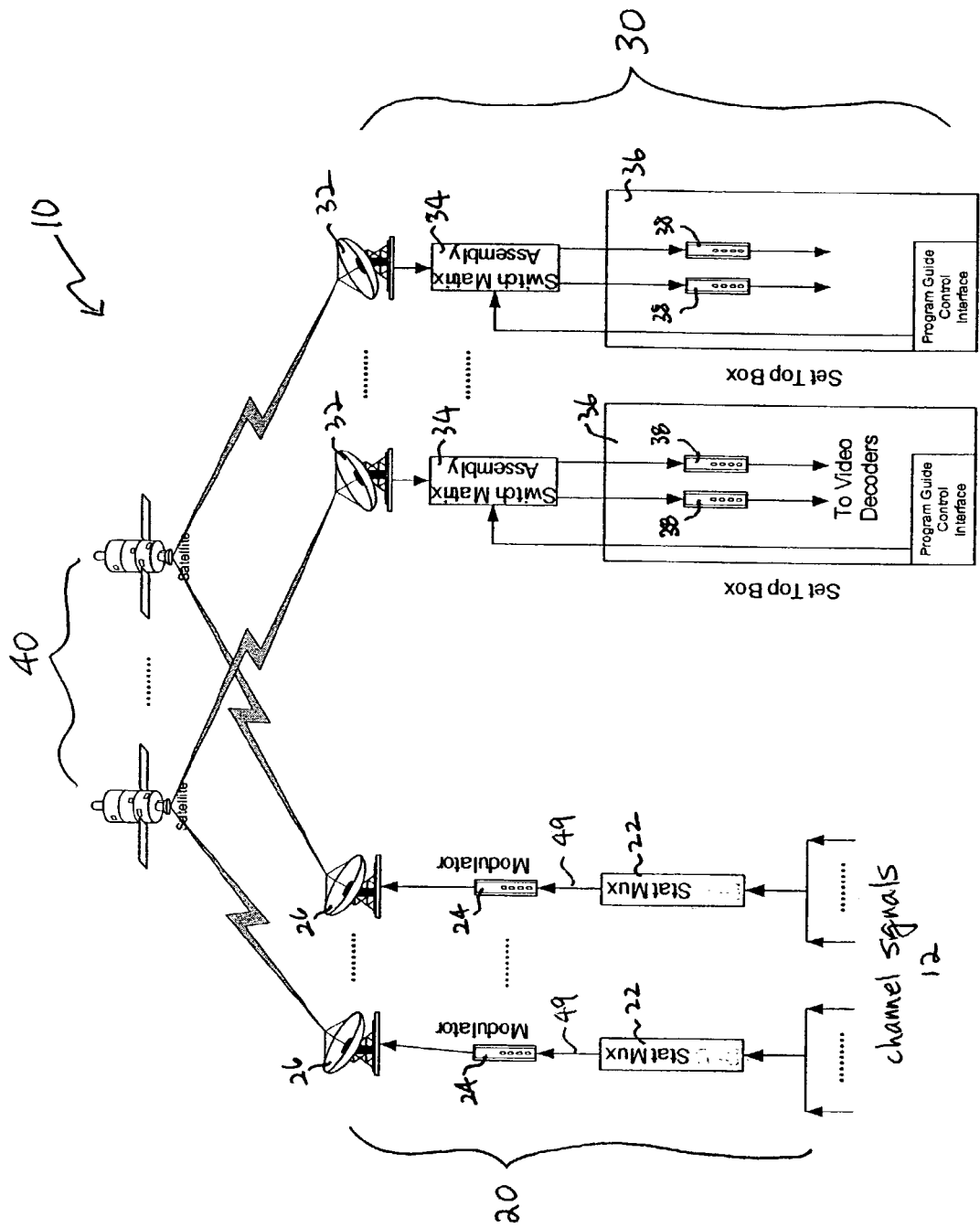
FIG. 1 depicts a satellite communication system in accordance with the invention.

FIG. 1 depicts an embodiment of a satellite communication system 10 that includes an uplink system 20 and a receiving station 30. The uplink system 20 and the receiving station 30 communicate via satellite transponders 40. The uplink system 20, which receives channel/program data from a signal source (not shown), is usually in a location that is remote from the location of the receiving station 30. The receiving station 30, which includes a set top box, is usually located near an end user, such as a television watcher.

The uplink system may include a multiplexer 22, a modulator 24, and a transmission antenna 26. In one embodiment, eight to ten digital MPEG2 program streams may be fed into the multiplexer 22, wherein each stream contains data for one channel. The multiplexed channels (herein referred to as a "virtual channel", are then individually modulated and fed into the transmission antenna 26. The transmission antenna 26 uplinks signals to one of the orbiting satellites. Although FIG. 1 depicts two multiplexers, two modulators, and two transmission antennas, the invention is not limited to any specific number of components in the uplink station. The modulator 24 may be any of the commercially available Digital Video Broadcasting (DVB) modulator. The modulator 24 converts the input signal into a frequency wave having the frequency of a selected satellite transponder. The transmission antenna 26 may be any single-beam or multi-beam antenna that is deemed suitable for the satellite communication system 10 by a person of ordinary skill in the art, who will also understand that DVB modulation is not a required part of the invention.

By the time the satellites 40 receive a signal from the uplink system 20, the power level of the signal is low because of the long distance the signal had to travel. The power level of the signal, therefore, is boosted by amplifiers on board the satellite before being retransmitted to the receiving station 30. The equipment required to amplify the signal within a given frequency range is commonly referred to as a transponder. A transponder typically operates over a limited frequency bandwidth, and a satellite may have more than one transponder on it. Frequently, one transponder is used to transmit signals for one channel.

The receiving station 30 receives the retransmitted signals from the transponders. The retransmitted signals for the channels are received through a receiving antenna 32 and forwarded to a switch matrix assembly 34. The switch matrix assembly 34 discards unwanted signals (i.e., signals for channels that were not selected by the user) and forwards the desired signals to a set top box 36. In the embodiment shown, each switch matrix forwards two channels to a set top box 36. The set top box 36 includes a modulator 38 and a program guide control interface that may be used to receive user input. The receiving antenna 32 may be implemented with a plurality of single beam antenna components, a single multiple beam antenna, or a combination of single beam and multiple beam antennas to receive the plurality of satellite signals. The receiving antenna 32 produces a plurality of output signals corresponding to satellite signals that were received. This signal identity remains true whether the transponders are on different satellites or on one satellite. The demodulators 38 may be any of the commercially available DVB demodulators a person of ordinary skill in the art would consider to be suitable for data rate matching.

Figure 2:
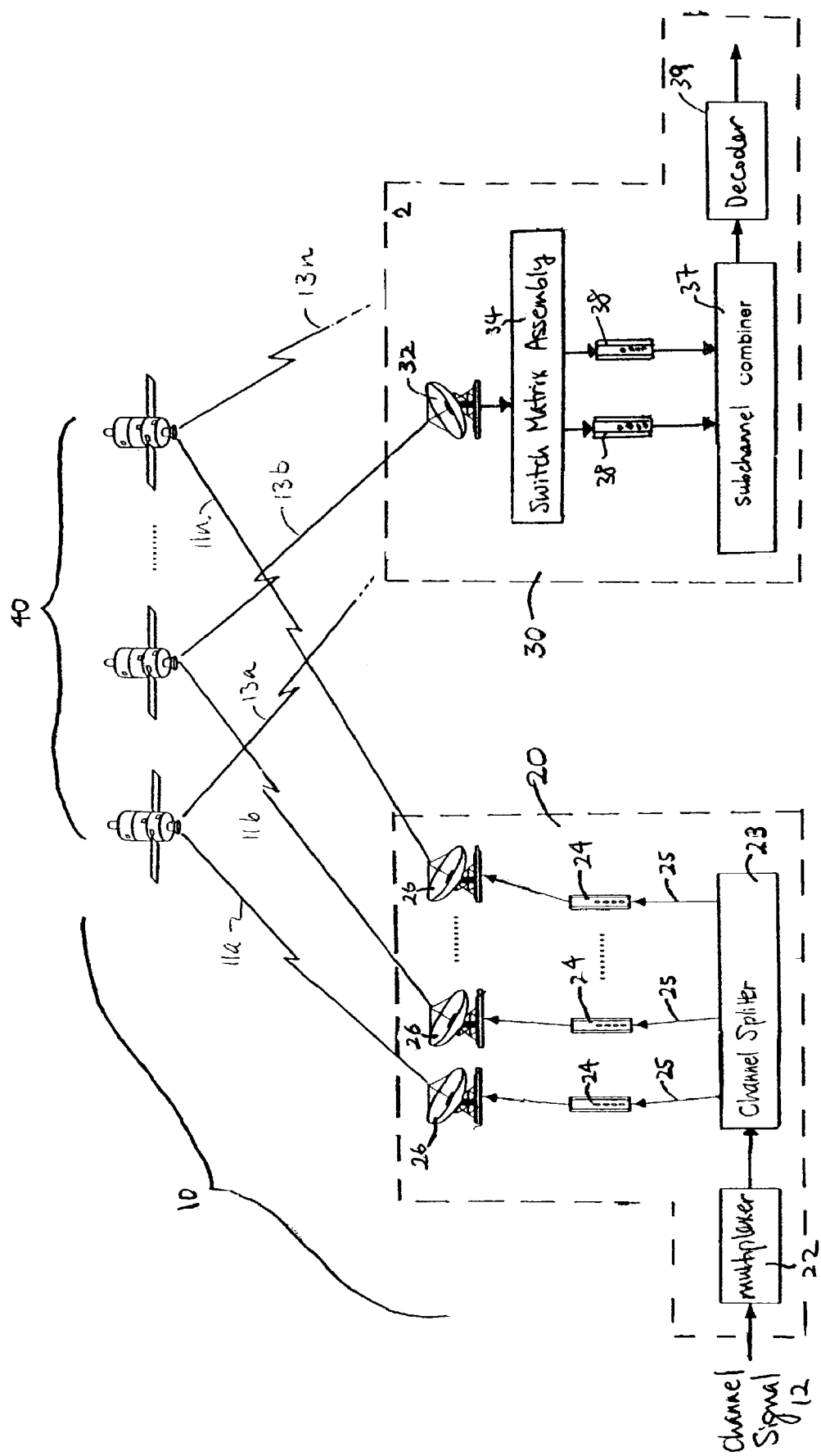
FIG. 2 depicts a satellite communication system including a channel splitter and combiner in accordance with the invention.

FIG. 2 depicts an embodiment of a satellite communication system 10 that includes a channel splitter and combiner. In this embodiment, the uplink system 20 includes a channel splitter system 23 that splits an input signal 12 into a plurality of subchannels 25 and adjusts the frequency of each subchannel so that each subchannel can be transmitted via any "left over" bandwidth in a plurality of transponders and become recombined at the receiving station 30, which includes a subchannel combiner 36. Since a transponder is typically used to transmit one channel, adding a channel usually requires adding another transponder. However, with this embodiment including a channel splitter and combiner, a channel can be added without adding an extra transponder because the channel can be split up into subchannels and transmitted via any unused bandwidth in already existing transponders, to be recombined later into a faithful replica 38 of the original channel. The receiving antenna 32 in this embodiment may be, like the receiving antenna 32 in the embodiment of FIG. 1, implemented with one or more antennas depending on the number of receive feeds in the antennas.

The multiple-transponders-per-channel embodiment of FIG. 2 is not limited to being used with subchannels. In reality, it is likely that some channels are transmitted over full transponders and other channels are split into subchannels. A controller keeps track of the available bandwidth on each transponder so that a channel may be split up into subchannels only if it is desirable to do so.

Figure 3:
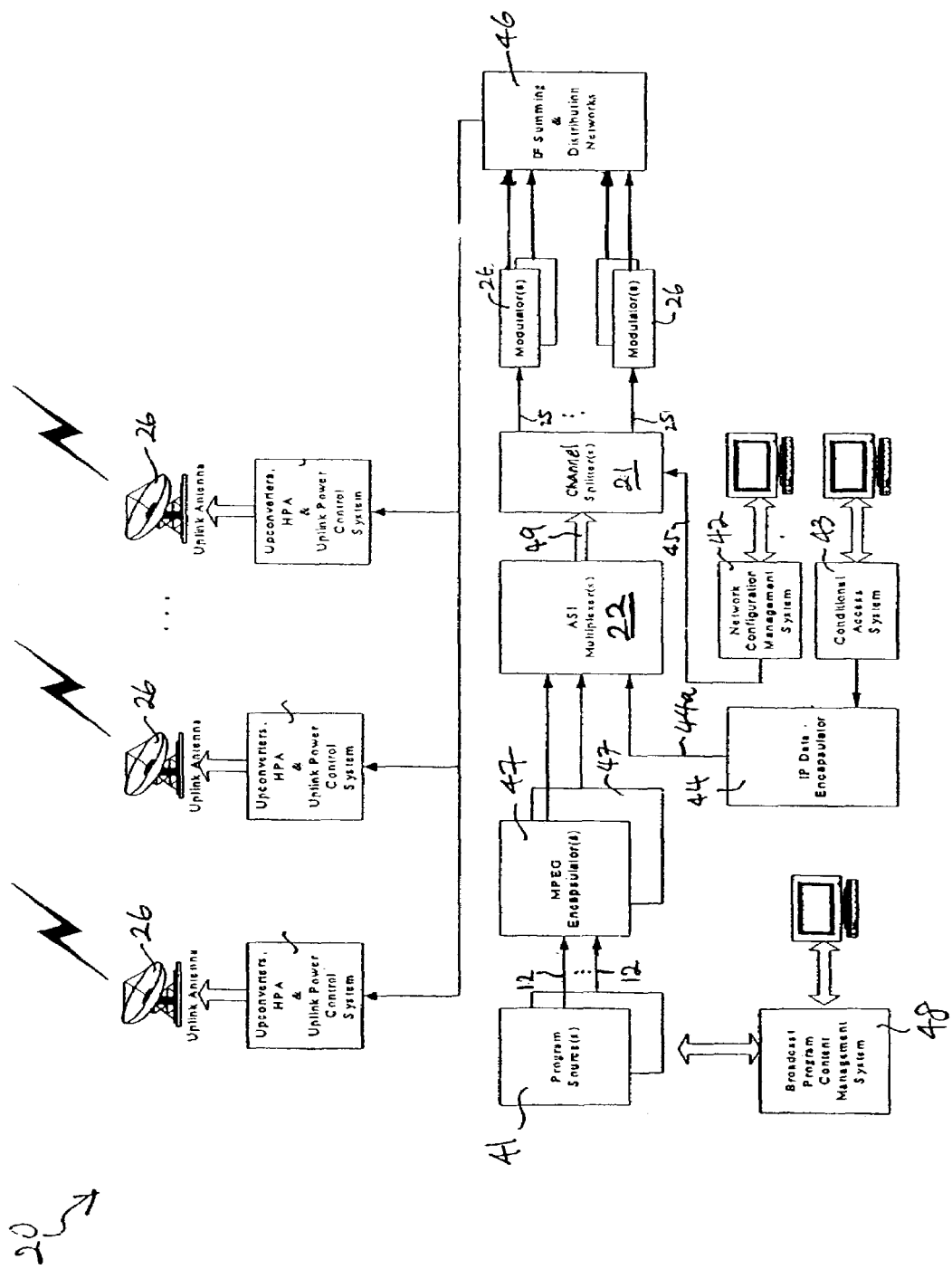
FIG. 3 depicts the uplink system of FIG. 2.

FIG. 3 depicts the uplink system 20 in more detail. Each of channel signals 12 originates from a program source 41. The content of the program source 41 is determined by a broadcast program content management system 48, which may be a content broadcasting station (e.g., Fox). Each channel signal 12, which includes raw data packets, feeds into the uplink system 20 and becomes encapsulated while passing through an MPEG encapsulator 47. During the encapsulation process, the raw data packets are fragmented and otherwise made to comply with the MPEG standard. Each stream of channel signal may be encapsulated by a unique encapsulator 47. The streams of encapsulated data packets are then multiplexed in multiplexer 22. Optionally, information from a conditional access system 43, which keeps track of which channels each of the set top boxes 36 (see FIG. 1) is allowed to receive, may be multiplexed with the encapsulated data packets. Data from the conditional access system 43 prevents a set top box 36 from receiving signals for channels that the user of the particular set top box did not subscribe to. For example, if a user subscribed to ESPN but not to HBO, the conditional access system 43 includes an encryption key for ESPN but not for HBO in the information 44a for the particular user's set top box. An IP data encapsulator 44 formats the information 44a before it is fed into the multiplexer 22. The multiplexer 22 multiplexes the information 44a with one or more channel signals to form a virtual channel 49.

The channel splitter 21 then receives this virtual channel 49 and splits it into subchannels 25. One or more channel splitter(s) 21 receives network configuration data 45 from a network configuration management system 42, which maintains configuration data about which subchannels 25 carry data for a particular program/channel. The network configuration data 45, therefore, contains a "channel map" that matches each program/channel to one or more subchannels. Once each of these subchannels 25 is modulated by a modulator 26, a distribution network 46 forwards the subchannels 25 to proper upconverter and uplink power control system 27 and to the uplink antennas 26.

If a full transponder were available, the network configuration management system 42 would indicate there is only one subchannel for the channel signal that is being transmitted via this full transponder. In other words, no splitting occurs for that channel signal when it passes through the channel splitter 21. The "channel map" would properly indicate that there is only one subchannel (which essentially contains all the information in the channel signal) for this particular channel. This single subchannel would be modulated in modulator 26 and uplinked, in the same way divided-up subchannels 25 would be. Thus, when there are many program signals feeding into the encaplsulators 47, the signals coming out of the channel splitter 21 may be a mix of one or more "subchannels" that contain complete data for a program (full-content subchannels) and subchannels that each contains only a part of a program (partial-content subchannels). Each full- or partial-content subchannel is uplinked to a transponder with the appropriate amount of bandwidth.

Figure 4:
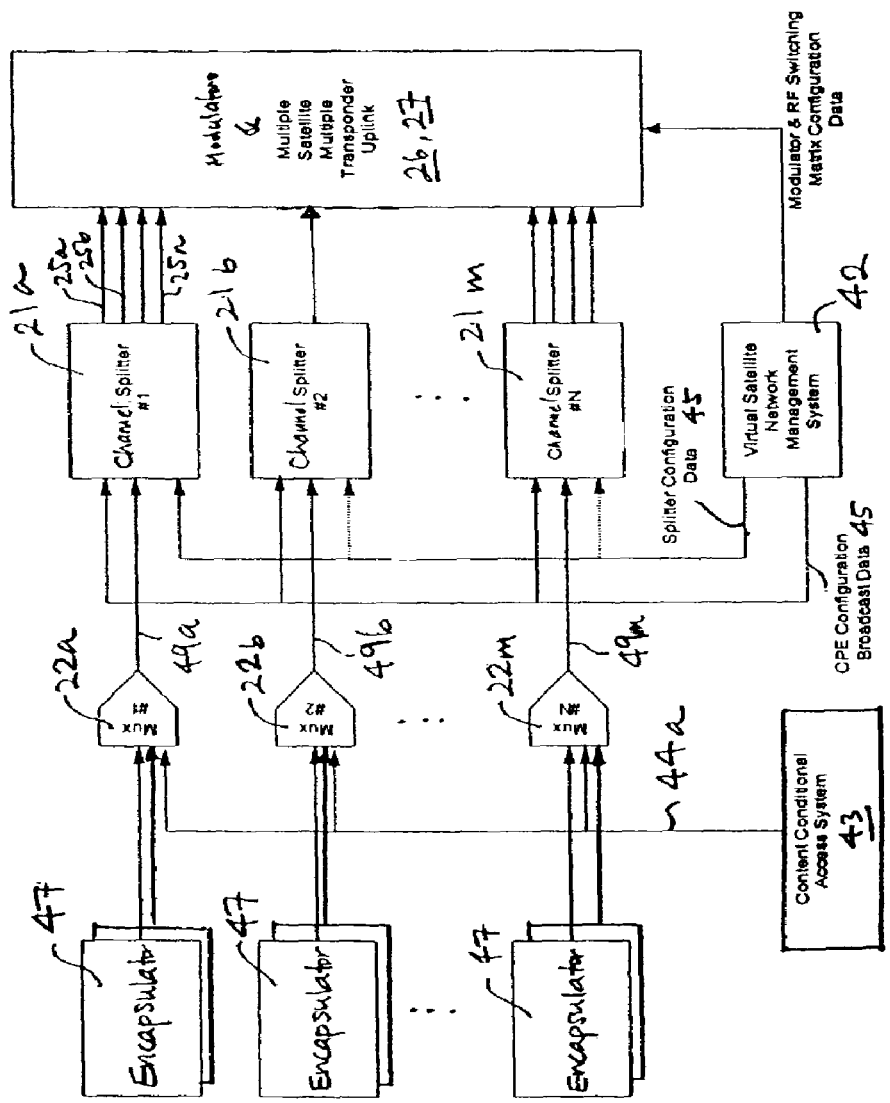
FIG. 4 depicts an embodiment including a mixture of a full-subchannel and partial-subchannels.

FIG. 4 illustrates how a mix of full-content subchannels and partial-content subchannels is created in the uplink station 20. Each encapsulator 47 encapsulates one program/channel, and a plurality of encapsulators 47 feed encapsulated data streams into each of the m multiplexers. As mentioned above in reference to FIG. 3, the multiplexers 22 receive information 44a regarding conditional access from the content conditional access system 43. Each of the multiplexers may receive identical information 44a. The multiplexers 22 generate virtual channels 49a–49m, each of which feeds into one of the channel splitters 21a–21m. Also fed into the channel splitters 21a–21m are the configuration broadcast data 45 from the network management system 42. The network management system 42 determines the splitter and CPE configuration broadcast data 45 by using the content channel configuration and the space segment subchannel configuration. The content channel configuration specifies the output of the content multiplexers 29 and their bandwidths. The outputs of a content multiplexers 29, which are DVB transport streams, are mapped one-to-one to virtual transponders and each transport stream has a bandwidth of around 36 MHz. As for the splitter and CPE broadcast configuration data 45, this data specifies the satellites, the transponders on each of the satellites, and the frequencies and bandwidths of each subchannel/channel on each transponder.

In the particular, example shown in FIG. 4, channel splitter 21a and Channel Splitter 21m each divides a respective virtual channel 49a and 49m into a plurality of subchannels. These subchannels are then modulated individually and uplinked to different transponders. The total combined bandwidths of the subchannels exiting each channel splitter 21a and 21m is sufficient to handle all of the content of the respective virtual channels 49a and 49m. The channel splitter 21b, on the other hand, does not divide the virtual channel 49b into subchannels because there is a full transponder available for virtual channel 49b. Had a full transponder not been available, virtual channel 49b might have been divided into subchannels.

The operating cost of the satellite communication system 40 increases with the number of subchannels. The network management system 42 minimizes the total cost of the space segment needed for satellite communication by assigning each DVB transport stream coming out of the content multiplexers 22 to one or more subchannels (each subchannel can only be associated with one DVB transport stream). By assigning the content to the subchannels, the network management system 42 has effectively constructed a mapping of the content channels to subchannels. The configuration broadcast data 45 includes this mapping information. The network management system 42 also sends individual channel/subchannel configuration to each channel splitter 21 based upon the overall system channel/subchannel configuration, and to the modulators 26 and an RF switching matrix (not shown) in the uplink transmitters 27. This channel/subchannel map is sent to the receiving station 30 so that the receiving station 30 can determine which set of subchannels to combine in order to reconstruct a content stream. The end user sees the content channels as displayed in a program guide. The end user does not see the physical subchannel mapping.

Figure 5:
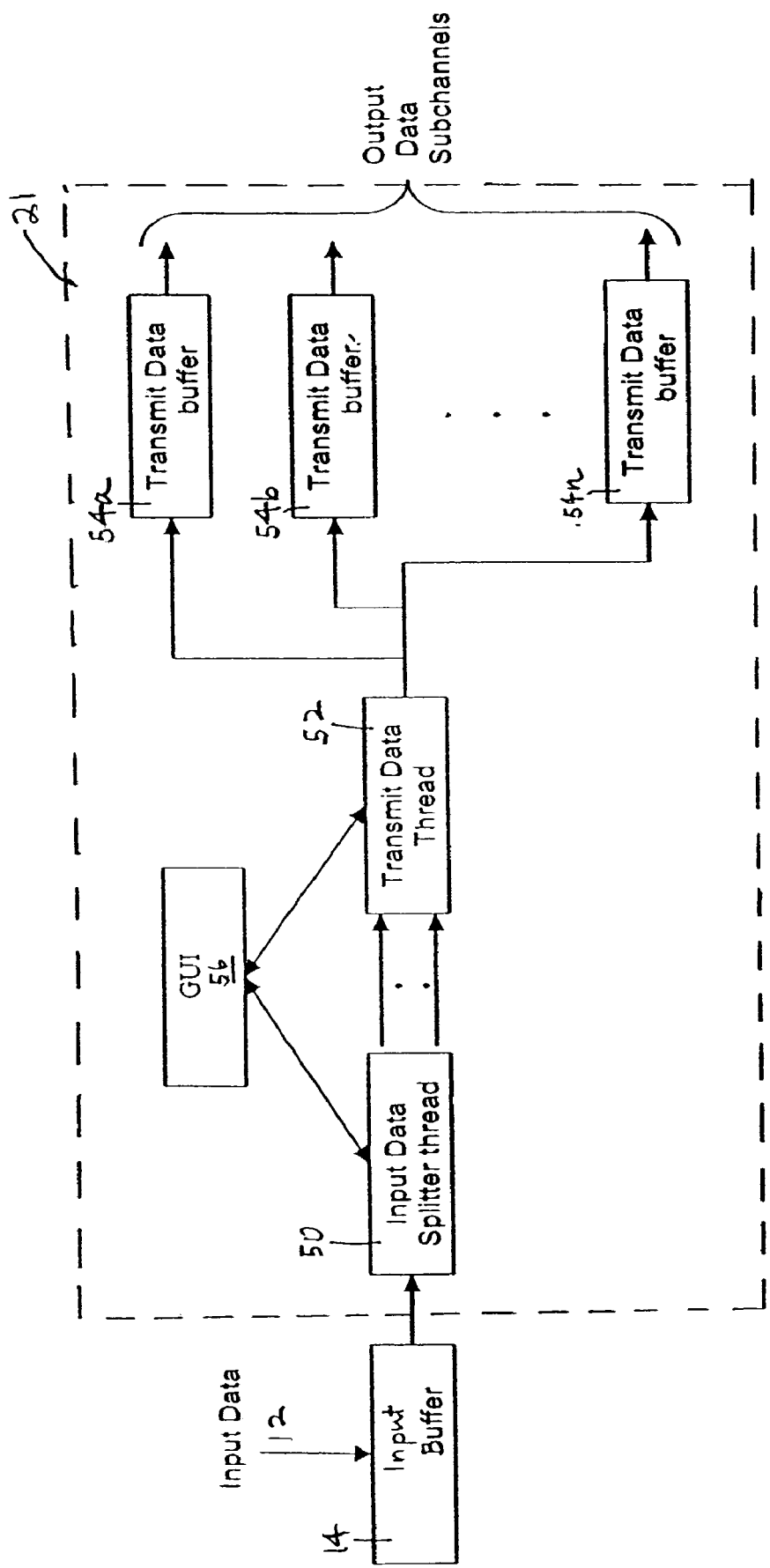
FIG. 5 depicts the channel splitter of FIG. 3.

FIG. 5 depicts an exemplary channel splitter 21, which receives the output of input buffer 14. The input buffer 14 holds the channel signal 12 until the channel splitter 21 is ready to receive the channel signal 22. The channel splitter 21 is a computer with software modules such as an input data splitter thread 50, a transmit data thread 52, and transmit data buffers 54. The input signal that comes out of input buffer 23 enter input data splitter thread 50, which divides the incoming stream of data frames among a preselected number of subchannels. The channel splitter 21 is programmed with the configuration of subchannels 25, such as the number of subchannels and the available bandwidth of each subchannel. Using this configuration information, channel splitter 21 divides the input signal in a way that uses the available bandwidth of each subchannel while keeping recombination as easy as possible. For example, the data frames may be distributed on a sequential frame-by-frame basis to the available bandwidth in each successive subchannel. Typically, in a content-division process, the content of the channel signal 12 is divided such that the signals in each of the subchannels contain at least some mutually exclusive information. The subchannel signals coming out of the input data splitter thread 50 feed into the transmit data thread 52, which prepares each subchannel signal to be transmitted through separate subchannels 25. The transmit data thread 52 properly directs the data frames into one of transmit data buffers 54, each of which connects to subchannels 25, respectively. At the appropriate time, data frames leave transmit data buffer 54 and feed into modulators 24 (see FIG. 1). The channel splitter 21 may be configured manually by a user using a Graphic User Interface 56 to configure the data splitter thread 50 and the transmit data thread 52. In alternative configurations, the configuration data may be transmitted automatically from the virtual satellite system's network management system 42.

Figure 6:
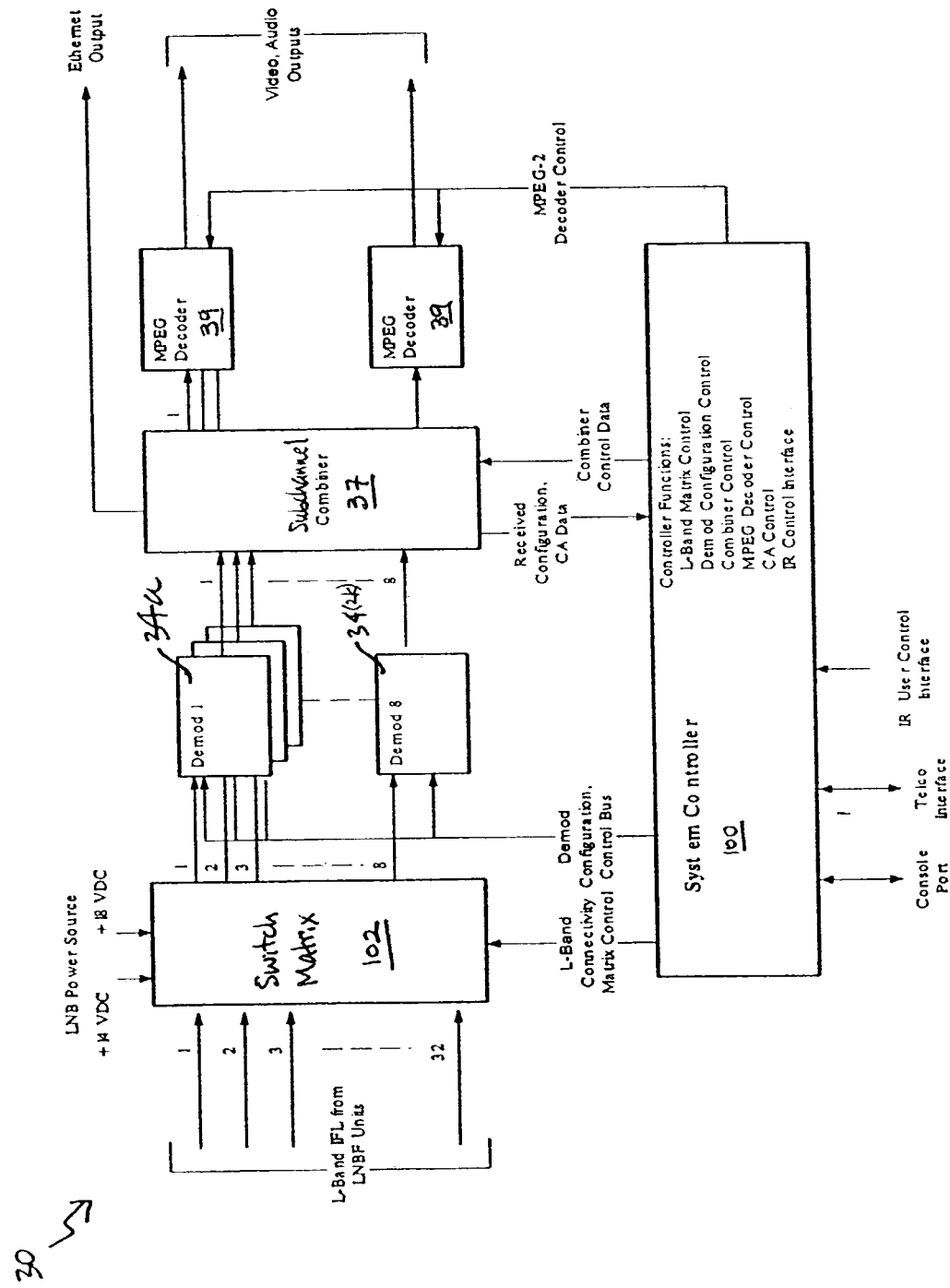
FIG. 6 depicts the receiving station of FIG. 1 including a switch matrix.

FIG. 6 depicts a system controller 100 that is a part of the receiving station 30 that may reside in an end user equipment, e.g., a set top box. Although not shown, a person of ordinary skill in the art would understand that the receiving antennas 32 (see FIG. 1) that precede a switch matrix 102 may have n (e.g., 16) Low Noise Block Converter Feed (LNBF) devices that receive signals from different transponders. The switch matrix 102 connects the n dual-polarization LNBF devices mounted on the antennas to at least k demodulators, wherein "k" is the predetermined maximum number of subchannels that are combined to form the one or more selected virtual channels 49 that contain real channel programs. As the n dual-polarization LNBF devices result in 2n L-band coaxial inputs of uniform polarization states, a total of 2n (e.g., 32 in the example shown) different subchannel signals can be received. In the particular example, 32 subchannel signals are fed into the switch matrix 102. While the switch matrix 102 receives all 32 subchannel signals, it discards the subchannel signals that are not needed to reconstruct the user-selected channels and outputs only the necessary subchannel signals. In the example of FIG. 6, k=4 (i.e., four subchannels are combined to reconstruct a channel signal). However, the switch matrix 102 shown in the example generates 2k (i.e., 8) subchannels because the particular end user equipment is made to support at least two output devices (e.g., televisions). Thus, the particular dual-output system can send two different channels to two different output devices.

The system controller 100 receives a program selection from a user and uses the channel map from the network configuration data 45 to determine which eight subchannels of subchannels 25 are needed to produce the two selected channels. The system controller 100 then forwards the identity of these eight subchannels to the switch matrix 102 so that the switch matrix 102 can discard the unnecessary subchannels and output the eight subchannels needed to produce the selected channels. Each of the 2k outputs that were fed into demodulators 34a through 34(2k) become combined into channels in subchannel combiner 37. The recombined programs/channels coming out of the subchannel combiner 37 are "virtual channels," similar to the virtual channels 49 that were fed into the channel splitter(s) in FIG. 3 and FIG. 4. The channels are then decoded in an MPEG decoder 39. The system controller 100, which is part of the end user equipment, sends commands (e.g., electrical signals) to the switch matrix 102, the demodulators 34, and the combiner 37 to ensure that the subchannels are properly combined. The system controller 100 also controls the decoders 39 and exchanges information with a user through a user control interface (e.g., infrared control interface). The content of the combined channel is then presented in a video and/or audio output to an end user. The components of the end user equipment shown in FIG. 6 are commercially available, and a person of ordinary skill in the art would understand how to build this end user equipment based on the information provided herein.

The switch matrix 102 reduces the number of coaxial cables between the outdoor unit and the end user equipment. It also reduces the cost of the indoor unit by using fewer demodulators than the total number of subchannels, since the unnecessary subchannels are discarded before reaching the demodulators. The switch matrix 102, which is a part of the outdoor equipment, is connected to the set top box 36 (see FIG. 1), which is an indoor unit, by one or more standard L-band coaxial cables. These coaxial cables may also be used to supply DC power to the LNBFs. Each output is capable of being connected to any of the 2n inputs. An output can be connected to no more than one input, and an input can be connected to more than one output.

Figure 7:
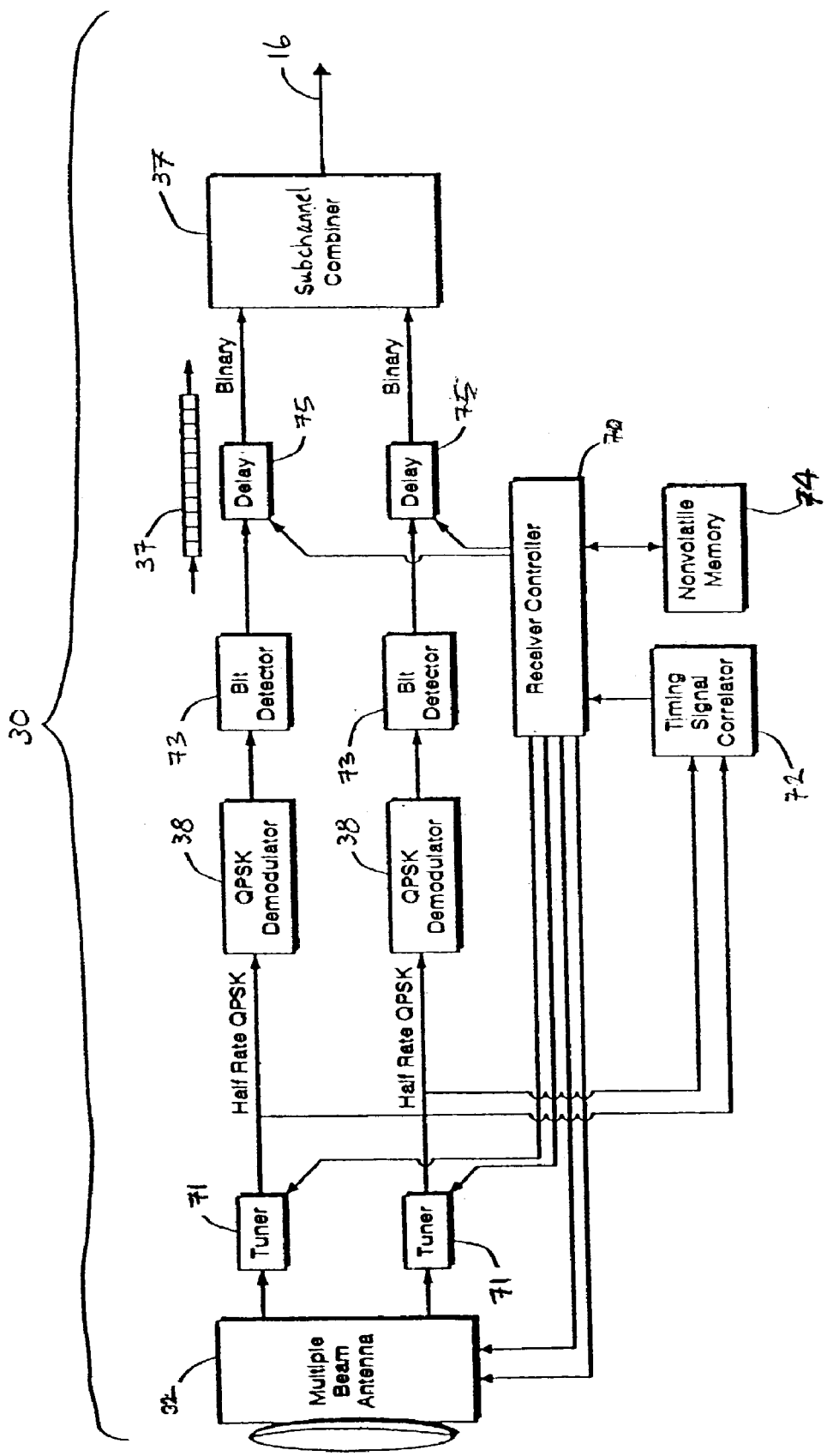
FIG. 7 depicts an exemplary receiving station of FIG. 1 having two subchannels.

FIG. 7 depicts an exemplary two-subchannel (n=2) receiving station 30 in accordance with one embodiment of satellite communication system 10. In this embodiment, the radio frequency carriers feeding the demodulators 38 are quaternary phase shift keying (QPSK) modulated signals and receiving antenna 32 is a multiple beam antenna, although the invention is not so limited. The receiving antenna 32 emits first and second signals into tuners 71. Each tuner shifts a band of higher frequencies to a band of lower frequencies of equal bandwidth such that receiver controller 70 sets the center frequency of the higher band, but the lower band is fixed. The tuners 71 emit QPSK modulated signals at a frequency that the QPSK demodulators 38 expect to receive. As there are two subchannels in this embodiment, the data rate of the binary information contained in these QPSK signals is approximately half the data rate of original channel signal, R. The respective output of QPSK demodulators 38 emit signals to bit detectors 73, which in turn produce streams of binary data corresponding to subchannels 25 in uplink system 20. The delay operators 75 synchronize the data streams by introducing delay in the first-arriving binary stream such that there is a minimum of relative delay between the respective delay operator outputs.

The receiver controller 70 responds to user input (not shown) to select the transponders to combine, subsequently emitting control signals to receiving antenna 31 to direct its antenna patterns toward the satellites containing the selected transponders. The receiver controller 70 also selects each tuner frequency consistent with the signals emitted from the selected transponder. The receiver controller 70 further processes information from a timing signal correlator 72 to determine the correct setting of the delay operators 75. The timing signal correlator 72 receives and time-correlates the tuner outputs. For a system with more than two subchannels, timing signal correlator 72 may process tuner outputs in pairs to determine the relative delay between subchannels. A nonvolatile memory 74 contains parameters regarding the user-selected transponders to enable the correct setting of receiving antenna 32 and tuners 71. In one embodiment, timing signal correlator 72 correlates the outputs from tuners 71 with a stored version of the known timing signal, or by processing the recovered timing signal through a process that will produce a periodic output in response to the timing signal. One example of such a process is a matched filter. Once the delays 75 are adjusted to remove relative subchannel delay, tuners 71 are set to conduct the selected information-bearing transponder signals to the respective demodulators.

The subchannel combiner 37 reverses the content division process performed by the subchannel splitter 21 so as to produce a faithful replica of the original channel signal 12. The subchannel combiner 37 combines the outputs of delays 75 to produce reconstructed signal 16. The reconstructed signal 16 is substantially similar to original channel signal 12, and is transmitted at data rate of R and bandwidth of B. The subchannel combiner 37 forwards the reconstructed signal 16 to an output buffer (not shown). The reconstructed signal 16 is eventually viewed/heard by end users in a variety of commercially available formats, e.g., ASI.

In the case where a plurality of satellites are used to conduct a set of subchannels from an uplink system to a given receiving station, each subchannel will generally experience a different propagation delay. The receiving station 30 provides a method for determining the amount of time delay each subchannel experienced in order to combine them synchronously. Moreover, the receiving station 30 can accommodate the delay spread that may become present when using multiple satellites. For example, for an original channel running at 27 Mbps, the method accommodates more than 10 ms of delay spread. This capacity to accommodate 10 ms of delay should prevent most errors caused by delay spread, as satellites in a visible arc of 30 degrees have a maximum delay spread of approximately 6 ms.

Figure 8:
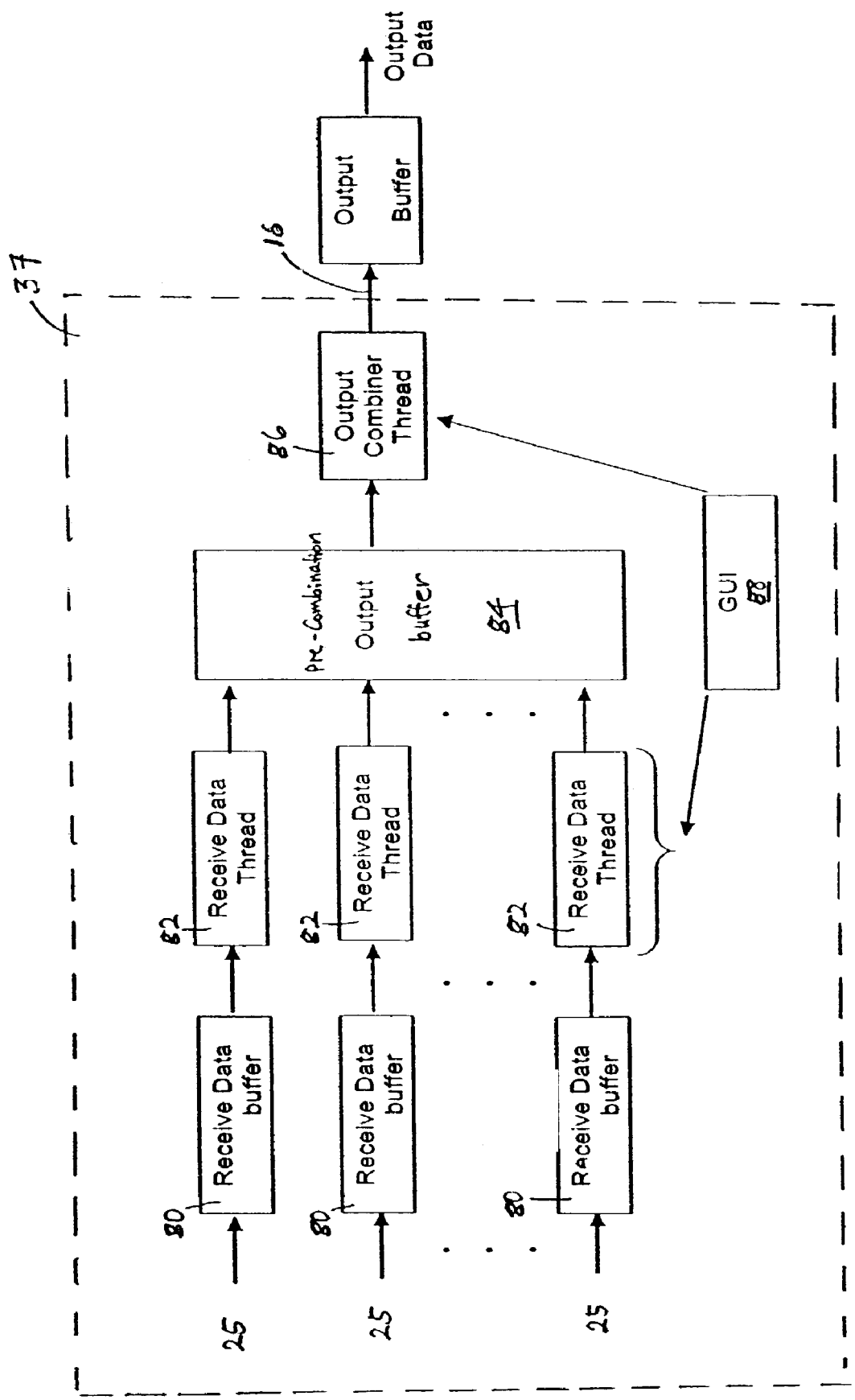
FIG. 8 depicts the subchannel combiner of the receiving station in FIG. 2.

FIG. 8 depicts a subchannel combiner 37 in accordance with a preferred embodiment of satellite communication system 40. The subchannel combiner 36 first receives subchannel signals 25 into receive data buffers 80. The subchannel signals emerging from the receive data buffers 80 enter receive data threads 82 and wait until the receive data threads 82 are ready to receive data. The receive data threads 82 are software modules that are preferably included in the end user equipment. In each of the receive data buffers 80, data frames are aligned in an order that facilitates recombination. The receive data threads 82, which receive data when a pre-combination output buffer 84 is ready to decapsulate and regroup the data frames in the subchannels 25, forwards the data frames that were waiting in the receive data buffer 80 to the pre-combination output buffer 84 in the order that they will be recombined. The pre-combination output buffer 84 converts the data frames into raw data packets and regroups them to produce raw data packets substantially similar to the raw data packets of channel signal 12. The pre-combination output buffer 84 feeds the raw packets into an output combiner thread 86 in the order that they will be recombined. The output combiner thread 86 recombines the data packets into reconstructed signal 38. Optionally, graphic user interface data 88 may be added manually to the receive data threads 82 and the output combiner thread 86 by a user to change some parameters that affect the output to the display device. The reconstructed signal 16 exiting the output combiner thread 86 is temporarily held in an output buffer.

Figure 9:
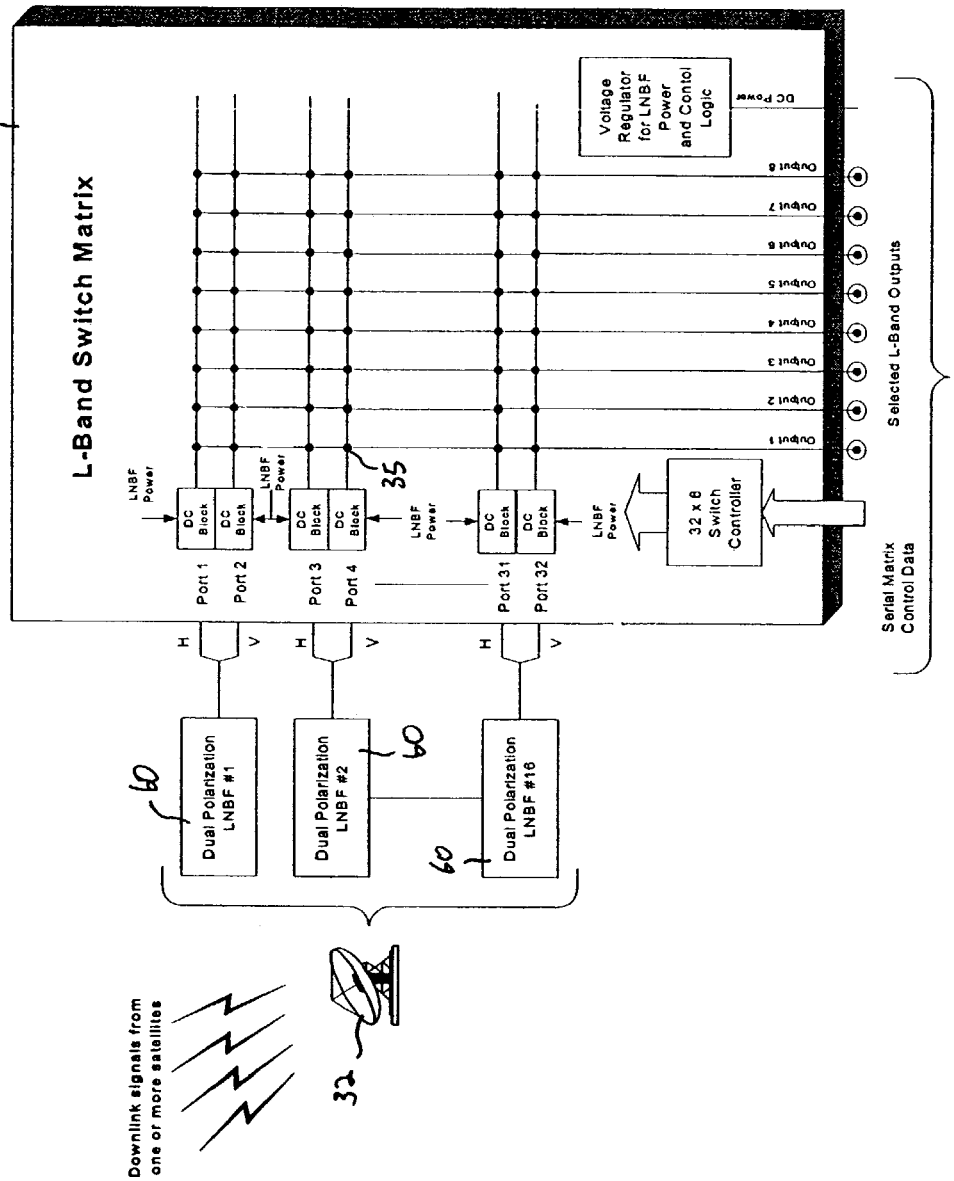
FIG. 9 depicts the switch matrix assembly of the receiving station in FIG. 2.

FIG. 9 depicts the switch matrix assembly 102 of the receiving station 30. The receiving antenna 32, which in this particular figure is shown as a multi-beam antenna, receives the channel signals from the satellites 40 and forwards them to low noise block down converters with feed devices (LNBF devices) 60. If dual-polarization LNBF devices are used, the number of LNBF devices may be half the number of channel signals that are received. Signals of the two polarization states are divided into horizontal and vertical polarization states before being fed into the switch matrix 102. The switch matrix 102 connects n (n=16 in the embodiment that is shown) dual polarization LNBF devices, and may have a predetermined number of output ports to support simultaneous reception of multiple MPEG streams. In FIG. 9, the switch matrix 102 is shown to have eight output ports. Both the input and the output ports may use standard L-Band coaxial cable, which may also be used to supply DC power to the LNBF devices. The switch matrix 102 allows each of the output ports to be connected to any of the input signals received by the switch matrix 102 and discards the remaining signals. Each dot 35 represents an independently programmable switch between input and output ports, and the switch matrix 102 may be controlled remotely by an IRCD and by a user using a handheld "clicker." When a user selects a channel using the clicker, the switch matrix 34 connects the output port the user is using to the input port for the selected channel signal. Where there is more than output port, the switch matrix 34 controls outputs to multiple units (e.g., televisions). A person of ordinary skill in the art would understand that the switch matrix is not limited to the particular topology that is shown.

Figure 10:
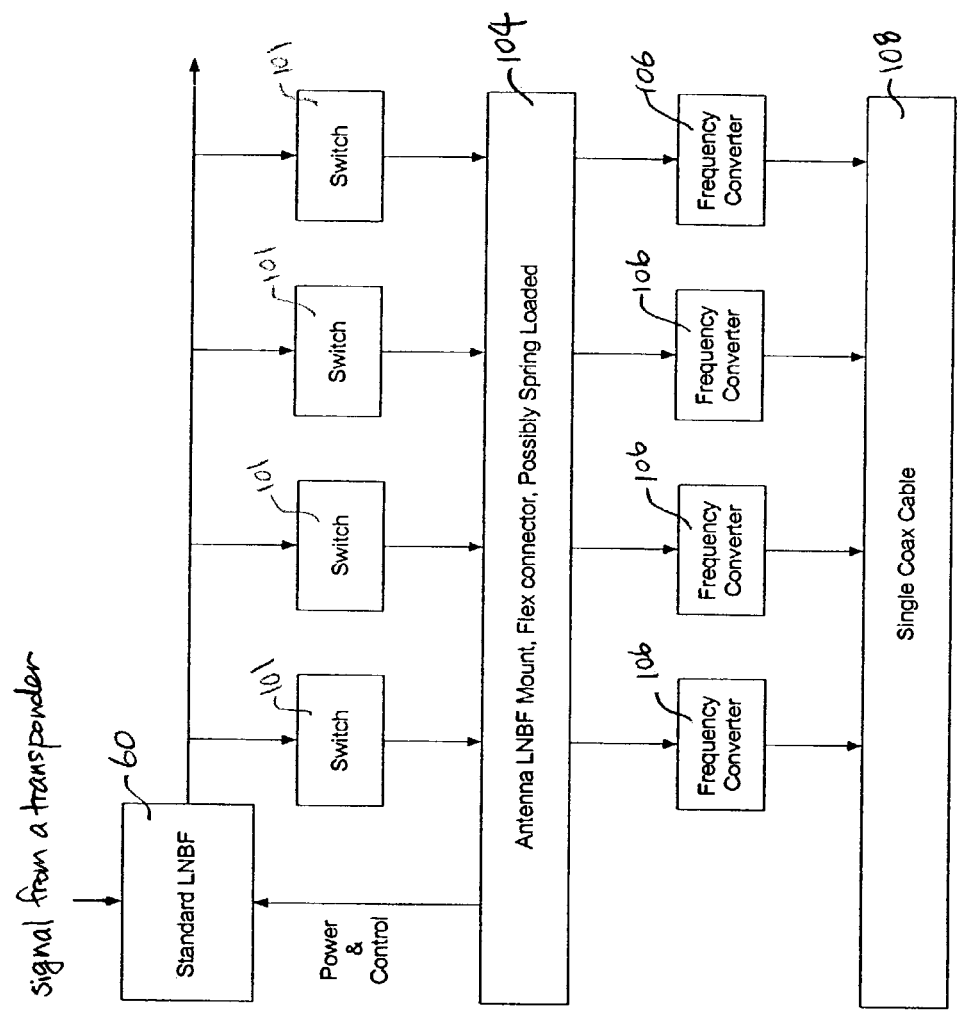
FIG. 10 depicts a configuration of an LNBF device, switches, and frequency converters that may be used to implement the invention.

FIG. 10 depicts an alternative embodiment of the switching concept of FIG. 9. This embodiment includes an LNBF device 60, a switch element 101, and a frequency converter 106, as shown. The switch elements 101 may be embedded in the LNBF device 60. The LNBF device 60, which is a well-known device that is usually mounted on an antenna/ LNBF mount 104, receives a signal from a transponder. The LNBF device also receives power and control commands through the antenna/LNBF mount 104. The switch element 101 selects one of the LNBF devices 60 and provides the output of the selected LNBF device to the frequency converter 106. The frequency converter 106 provide a signal to the combiner (not shown) using a standard co-axial cable 108. Just as in FIG. 9, certain channel signals are selected and the rest are discarded by the switch elements 101. When a user "switches channels," the switch elements 101 operate to forward the selected channel signals to the set top box.

Figure 11:
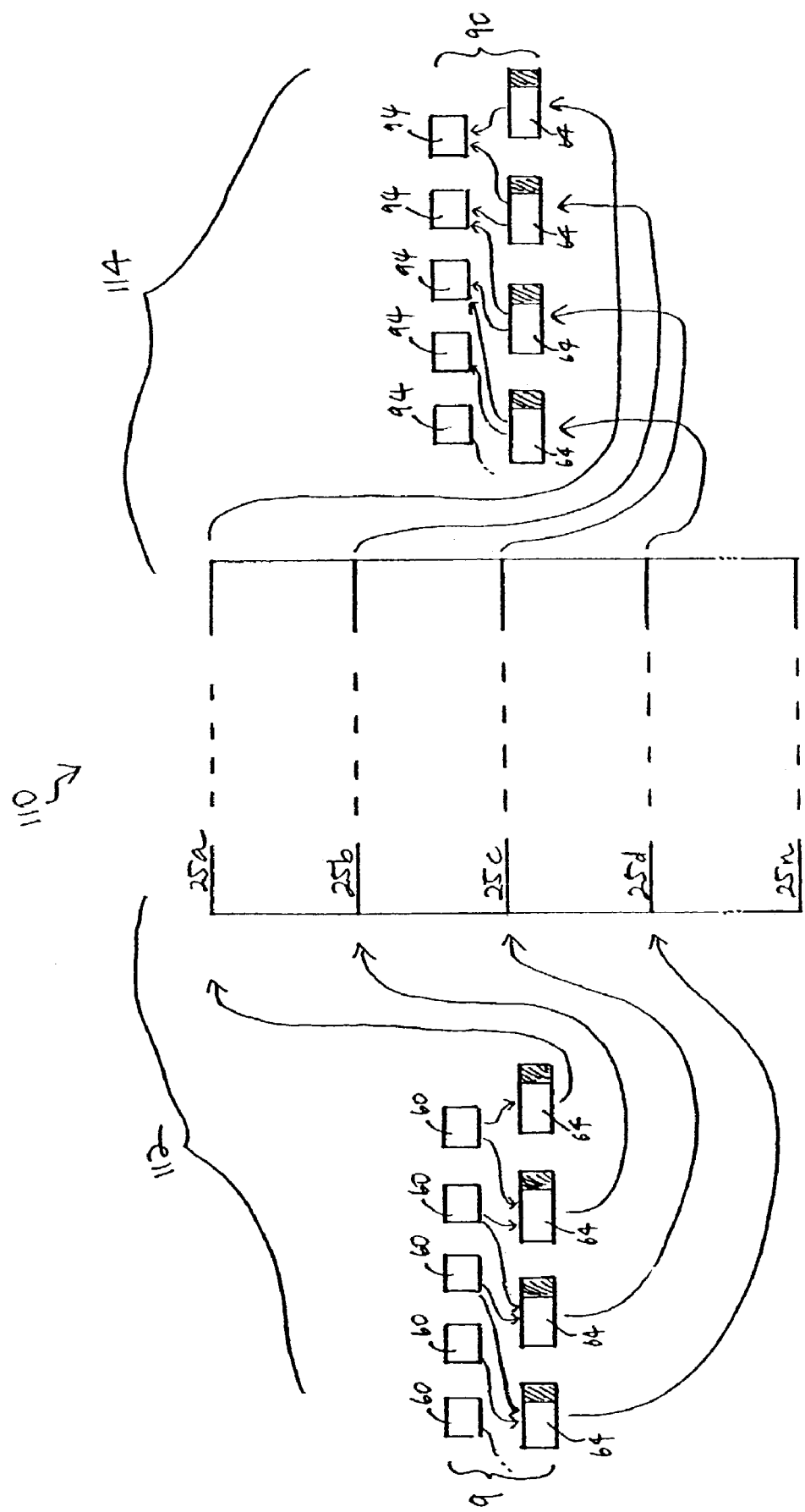
FIG. 11 depicts a process that data packets go through for the channel splitting and subchannel combining processes.

FIG. 11 schematically depicts the process 110 by which the data from the program source 41 (see FIG. 3) are split and combined. The process 110 includes a content splitting process 112 that takes place in the channel splitter system 24 (e.g., in the channel splitter 21 (shown in FIG. 3)) and a content combining process 114 that takes place in the subchannel combiner 36 (shown in FIG. 6). The channel splitter system 24 receives a stream of raw data packets 60 which are formatted to a specific standard (e.g., MPEG 2), for example by the MPEG encapsulator 47 (shown in FIG. 3). These raw data packets 60 are subjected to an encapsulation process 69. During the encapsulation process 69, the raw data packets 60 are divided into payloads of a predetermined size for each data packet 64. The formatted data packets 64 include headers (shown as shaded portions), each of which contains data (e.g., a counter) that is helpful for properly recombining the data packets later. The formatted data packets 64 are then divided among respective subchannels 25a through 25n via the transmit data thread 52 as described above in reference to FIG. 5. In the particular example shown in FIG. 1, the data packet 64 that is the first in order is transmitted via subchannel 25a, the next data packet 64 is transmitted via subchannel 25b, the data packet 64 after that is transmitted via subchannel 25c, and the fourth data packet 64 is transmitted via subchannel 25d. The subchannels 25a–25n are received by the receive data buffers 80 (shown in FIG. 7) and properly reordered in the pre-combination output buffer 84 (FIG. 7). The transmitted and reordered data packets 64 are then subjected to a decapsulation and defragmentation process 90 to be converted into reconstructed raw data packets 94. These reconstructed raw data packets 94 are eventually combined in the output combiner thread 86 (FIG. 7) of the subchannel combiner 36.

Figure 12:
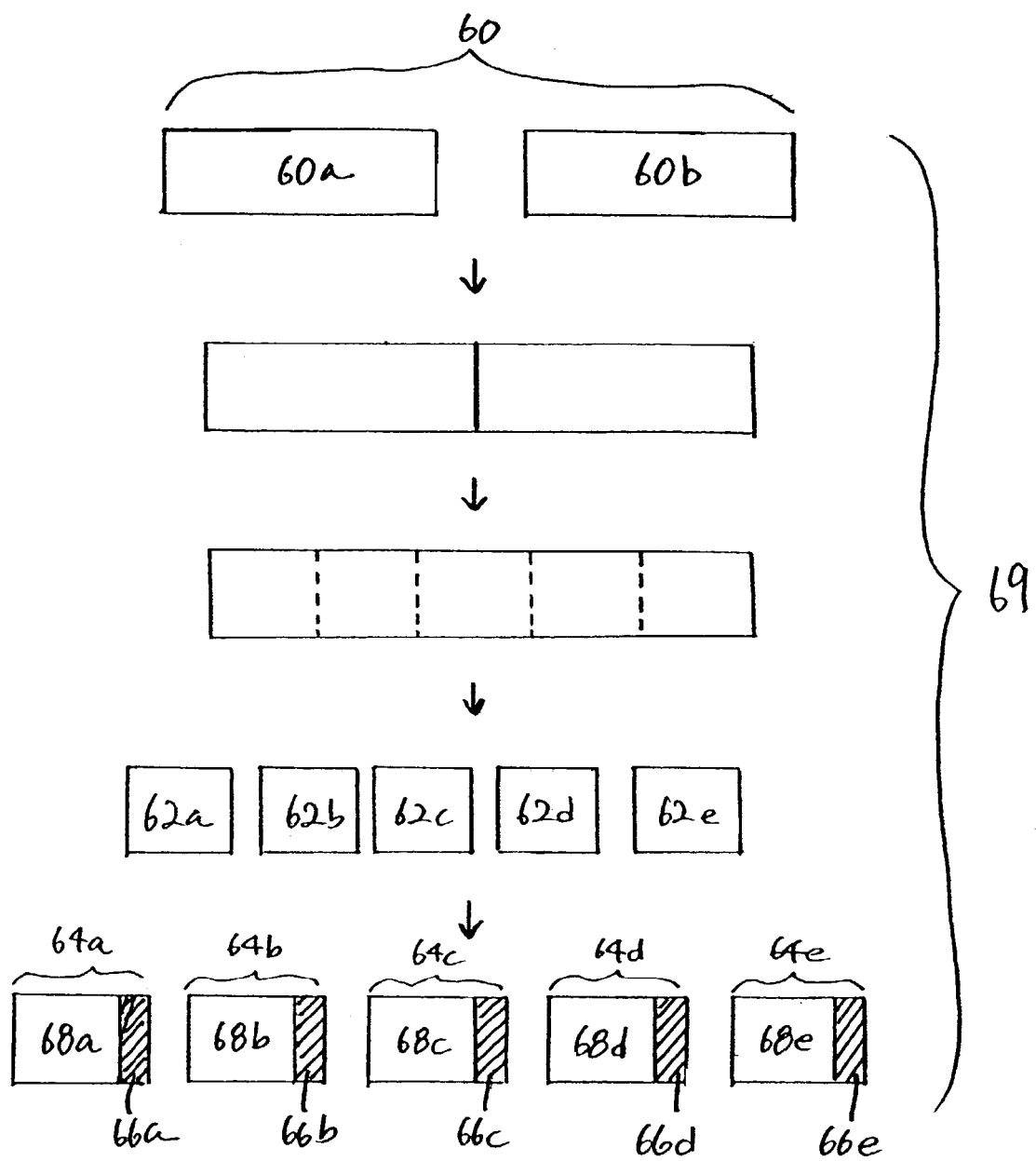
FIG. 12 depicts the channel fragmentation and encapsulation process that takes place in the uplink system.

FIG. 12 schematically depicts the fragmentation and encapsulation process 69 that takes place in channel splitter system 24. The channel signal 22, which is a data stream that feeds into input buffer 23 at a data rate of R and bandwidth of B, may consist of raw data packets 60 having an arbitrary format and size. Upon receiving raw data packets 60, input data splitter thread 50 (see FIG. 5) fragments the content of raw data packets 60 into packets 62 of a predetermined size range. The size limitation on each of packets 62 is a function of the frame format and the frame size to be used. In the example shown, the content of raw data packets 60a and 60b are regrouped into packets 62a–62e. Preferably, the regrouping is done without altering the sequence of data in the content of raw data packets 60a and 60b, so as to facilitate the reconstruction of raw data packets later. During the fragmentation process, the content of one raw data packet may be divided between two packets (e.g., packets 62a and 62b both contain content of raw data packet 60a), or the content of two raw data packet may be combined into one packet (e.g., packet 62c contains contents from raw data packet 60a and raw data packet 60b). Each of packets 62a–62e are then encapsulated in frames of a predetermined size and format to form data frames 64a–64e.

Each of data frames 64a–64e have a header 66a–66e and a payload 68a–68e where the payload 68a–68e stores the content of packets 62a–62e, respectively, and the header 66a–66e contains timing and sequence information that will help proper reconstruction of channel signal 22 later. A person of ordinary skill in the art will understand that the size of input buffer 23 is a function of the speed at which data enters input buffer 23 relative to the speed at which the rest of uplink station 20 processes the signals. Typically, data enter input buffer 23 at approximately the same rate that they leave input buffer 23.

The frame headers 66a–66e may comply with the well-known MPEG2 header standard. Each of the data frames 64a–64e may be 188-byte Digital Video Broadcasting (DVB) frame having a 4-byte header structure and a 184-byte payload. The 4-byte header may preferably include one synchronization status byte, 3 bits of packet type identifier, and 14 bits of sequence counter, plus other standard bits such as error indicator bit, payload unit start indicator, transport priority, etc. The synchronization status byte can be used for determining the start of each frame, identifying the source of the timing clock, trouble-shooting, and enhancing the reliability upon recombination. The sequence counter can be used to re-order the data packets. The channel splitter system 24 encodes any synchronization status bytes in the input data stream to avoid synchronization loss at the modulators 26a–26n. The transport error indicator bit indicates the presence of at least one uncorrectable bit error in the associated transport stream packet. The payload unit start indicator is a single-bit flag indicating where the payload begins, the transport priority bit indicates the priority of the associated packet relative to other packets of the same packet type identifier, and the 3 bits of packet type identifier indicates the type of data that is stored in the payload. The packet type identifier is used to separate the type of payload data such as DVB Transport, virtual satellite network management and control, etc. With 3 bits, the packet type identifier can handle up to 8 data types. The headers 66a–66e have the synch byte as the first byte, the sequence counter in the last 14 bits thereof, and the packet type bits somewhere in between the synch byte and the sequence counter. The definition and the location of the sequence counter and the packet type bits depend on the embodiment.

Figure 13:
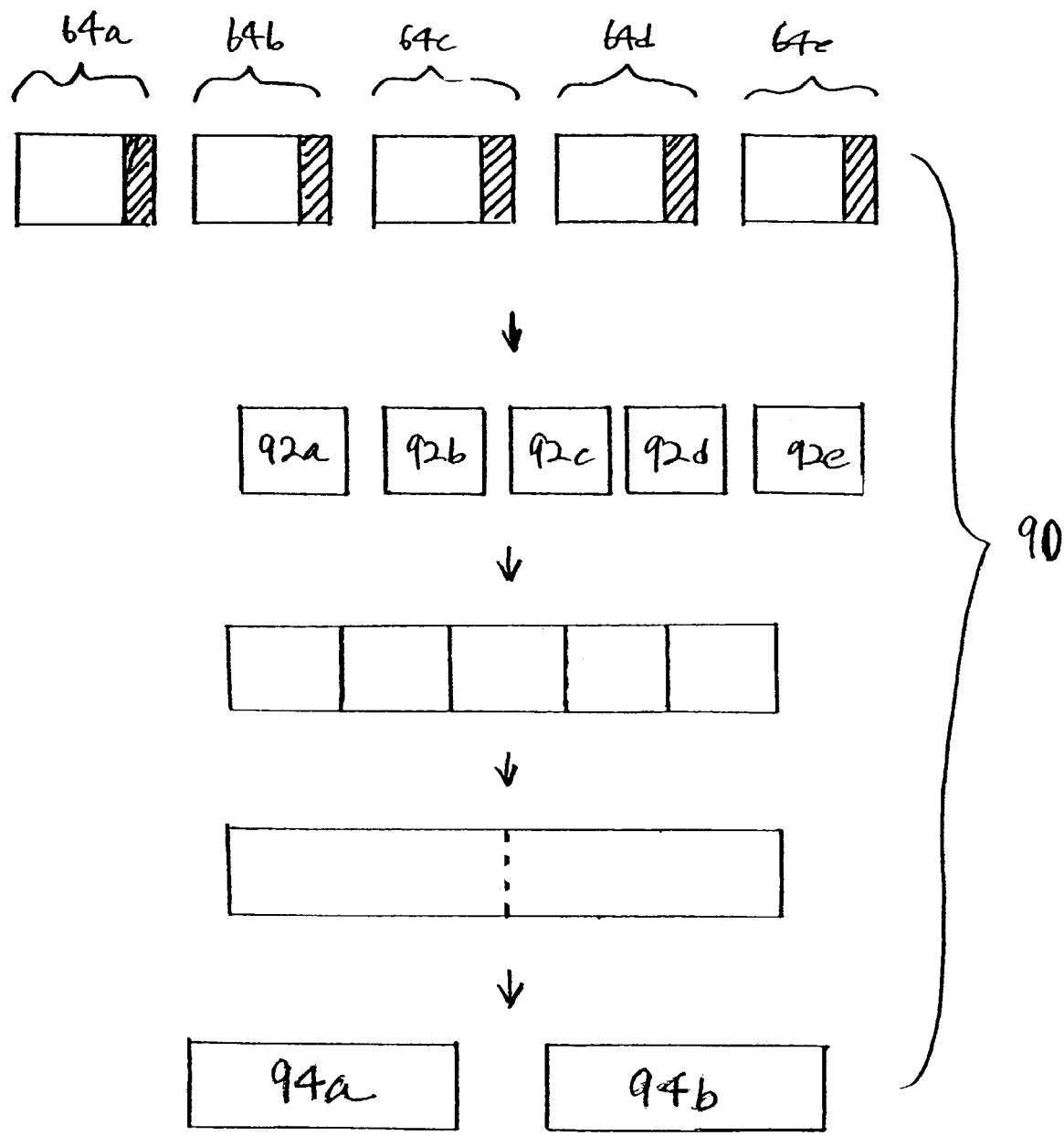
FIG. 13 depicts the channel defragmentation and decapsulation process that takes place in the receiving station.

FIG. 13 schematically depicts the decapsulation and defragmentation process 90 that occurs in the pre-combination output buffer 84 (see FIG. 8). The pre-combination output buffer 84 arranges data frames 64a–64e in an order that facilitates recombination, decapsulates the data frames to convert them into headerless data packets 92a–92e, then defragments them to create the raw data packets 94 that are substantially similar to the data packets 60 in the channel signal 22. Coming out of pre-combination data buffer 84 are raw data packets 94a and 94b that will be combined to form reconstructed signal 16. The modulators 24 and demodulators 38 (see FIG. 1) mark a data frame as NULL when the header of a data frame indicates that the content of the payload is unavailable or unreliable. When recombining the subchannels, any component of subchannel combiner 37 can be designed to discard the data frames marked as NULL.

While several particular forms and variations thereof have been illustrated and described, it will be apparent that various modifications can be made without departing from the spirit and scope of the invention. Accordingly it is not intended that the invention be limited, except by the appended claims.

What is claimed is:

1. A method of satellite communication that allows efficient use of available bandwidth, the method comprising:
   receiving a channel signal;
   dividing the channel signal into one or more subchannels according to available bandwidths, wherein dividing the channel signal comprises fragmenting the channel signal into data packets and encapsulating each of the data packets, wherein the encapsulating includes adding a header that contains information useful for combining the data packets to reconstruct the channel signal; and
   transmitting the subchannel to at least one transponder.

2. The method of claim 1, wherein there is only one subchannel and this one subchannel contains substantially all content data in the channel signal.

3. The method of claim 1, wherein a subchannel is transmitted to a single transponder having sufficient bandwidth for the entire subchannel.

4. The method of claim 1, wherein fragmenting the channel signal comprises at least one of combining contents of two of the data packets and dividing a content of one of the data packets.

5. The method of claim 1 further comprising assigning each of the encapsulated data packets to one of the subchannels that has available bandwidth.

6. The method of claim 1 further comprising:
   multiplexing a plurality of channel signals to form a virtual channel; and
   deciding whether to convert the virtual channel into multiple subchannels or a single subchannel.

7. The method of claim 1 further comprising adding network configuration data upon the dividing, wherein the network configuration data includes a map indicating which subchannel contains content data for the channel signal.

8. The method of claim 1 further comprising separately modulating each of the subchannels so that each of the subchannels is in a preselected frequency range.

9. The method of claim 1, wherein data rates for the subchannels are such that a sum of the data rates of the subchannels is approximately equal to the data rate of the channel signal.

10. The method of claim 1, wherein bandwidths for the subchannels are such that a sum of the bandwidths of the subchannels is approximately equal to the bandwidth of the channel signal.

11. The method of claim 1, wherein at least some of the subchannels travel at different data rates and bandwidths.

12. The method of claim 1, wherein the available bandwidth of the transponder is determined prior to the division.

13. A method of satellite communication that allows efficient use of available bandwidth, the method comprising:
   receiving a channel signal;
   dividing the channel signal into one or more subchannels according to available bandwidths;
   transmitting the subchannel to at least one transponder;
   multiplexing a plurality of channel signals to form a virtual channel;
   deciding whether to convert the virtual channel into multiple subchannels or a single subchannel; and
   adding conditional access data during the multiplexing, wherein the conditional access data identifies whether an end user equipment is allowed to access a subchannel.

14. A method of satellite communication that allows efficient use of available bandwidth, the method comprising:
   receiving a channel signal;
   dividing the channel signal into one or more subchannels according to available bandwidths;
   transmitting the subchannel to at least one transponder;
   receiving the subchannels;
   identifying a user selected channel;
   categorizing the subchannels into a first category and a second category wherein the first category contains subchannels needed to reconstruct the user selected channel; and
   combining the subchannels in the first category to reconstruct the channel signal.

15. The method of claim 14 further comprising:
   determining an order in which subparts in the subchannels are to be combined;
   defragmenting the subparts; and
   decapsulating the subparts.

16. A satellite communications system comprising:
   at least one low noise block converter feed (LNBF) device receiving signals from transponders;
   a switch matrix coupled to the LNBF device, wherein the switch matrix includes an independently programmable switch between each of a plurality of input ports and an output port and receives a command to turn the switch on and off in response to a user action end wherein the switch matrix receives a plurality of signals from the at least one LNBF device and forwards at least one signal that contains a user-selected content to one or more demodulators via one or more output ports, wherein the number of output ports matches the number of demodulators.

17. The system of claim 16 further comprising a frequency converter that adjusts the frequency of the signal from the output port to an operating frequency of a demodulator.

* * * * *